United States Patent
Gashi et al.

(10) Patent No.: US 9,920,440 B2
(45) Date of Patent: Mar. 20, 2018

(54) ELECTROCHEMICAL STACK DEVICE

(71) Applicant: Swiss Hydrogen SA, Fribourg (CH)

(72) Inventors: Rexhep Gashi, Givisiez (CH); Daniel Shapiro, Marly (CH); Elli Varkaraki, Bienne (CH)

(73) Assignee: Swiss Hydrogen SA, Fribourg (CH)

( * ) Notice: Subject to any disclaimer, the term of this patent is extended or adjusted under 35 U.S.C. 154(b) by 190 days.

(21) Appl. No.: 14/877,420

(22) Filed: Oct. 7, 2015

(65) Prior Publication Data
US 2016/0115603 A1    Apr. 28, 2016

(30) Foreign Application Priority Data
Oct. 24, 2014 (EP) .................... 14190301

(51) Int. Cl.
*C25B 9/20* (2006.01)
*H01M 8/02* (2016.01)
(Continued)

(52) U.S. Cl.
CPC .............. *C25B 9/206* (2013.01); *C25B 15/08* (2013.01); *H01M 8/0273* (2013.01);
(Continued)

(58) Field of Classification Search
CPC .................................................... C25B 9/206
(Continued)

(56) References Cited

U.S. PATENT DOCUMENTS 4,274,939 A * 6/1981 Bjaareklint ............. C25B 9/206
                                                      204/257
4,729,822 A * 3/1988 James ..................... C25B 9/206
                                                      204/255
(Continued)

OTHER PUBLICATIONS

European Search Report dated Apr. 2, 2015 in European Application 14190301.3, filed on Oct. 24, 2014 (with English translation).

*Primary Examiner* — Harry D Wilkins, III
(74) *Attorney, Agent, or Firm* — Oblon, McClelland, Maier & Neustadt, L.L.P.

(57) ABSTRACT

The invention relates to an electrochemical device intended for the production of products through electrochemical reaction of reactants, said electrochemical device comprising a stack of electrochemical cells (10), each cell (10) comprising a structure (16), two bipolar plates (18*a*, 18*b*) shared with adjacent cells (10), a membrane/electrode assembly (20) and two intermediate elements (21, 22) arranged to carry a current and the reactants/products to/from the membrane/electrode assembly (20).
According to the invention, said structure (16) of the cell (10) comprises a single frame (23) made in one piece, said frame (23) having upper and lower faces respectively arranged to form a plane contact with the bipolar plates (18*a*, 18*b*) disposed on either side of said frame (23), and a central opening (26) arranged to receive the membrane/electrode assembly (20) and the two intermediate elements (21, 22), said frame (23) comprising all the orifices (38, 40, 42, 44) necessary for feeding reactants and evacuating products, and housings (34, 54*a*, 58*a*, 60*a*) arranged to receive sealing
(Continued)

means (36, 56a, 56b; 62a, 62b, 64a, 64b) ensuring the sealing of each reactant and product.

5 Claims, 4 Drawing Sheets

(51) Int. Cl.
  *H01M 8/24* (2016.01)
  *H01M 8/2465* (2016.01)
  *H01M 8/0273* (2016.01)
  *H01M 8/0297* (2016.01)
  *C25B 15/08* (2006.01)
(52) U.S. Cl.
  CPC ....... *H01M 8/0297* (2013.01); *H01M 8/2465* (2013.01); *Y02E 60/366* (2013.01); *Y02P 70/56* (2015.11)
(58) Field of Classification Search
  USPC ......................................................... 204/256
  See application file for complete search history.

(56) References Cited

U.S. PATENT DOCUMENTS

| | | | | |
|---|---|---|---|---|
| 5,284,718 A * | 2/1994 | Chow | ................. | H01M 8/0271 429/437 |
| 6,080,290 A * | 6/2000 | Stuart | ................... | H01M 8/246 204/255 |
| 6,180,274 B1 | 1/2001 | Yoshimoto et al. | | |
| 6,309,521 B1 * | 10/2001 | Andrews | ................... | C25B 1/13 204/252 |
| 6,811,915 B2 * | 11/2004 | Dristy | ....................... | C25B 9/08 429/509 |
| 6,852,205 B1 * | 2/2005 | Toyoshima | ............... | C25B 9/20 204/253 |
| 6,855,450 B2 * | 2/2005 | Molter | ....................... | C25B 9/20 204/258 |
| 8,147,663 B2 * | 4/2012 | Suarez | ....................... | C25B 9/08 204/252 |
| 9,133,555 B2 * | 9/2015 | Ronan | ....................... | C25B 9/10 |
| 9,238,871 B2 * | 1/2016 | Reytier | ....................... | C25B 9/04 |
| 2002/0068208 A1 * | 6/2002 | Dristy | ....................... | C25B 9/08 429/510 |
| 2002/0100681 A1 * | 8/2002 | Kirk | ........................ | C25B 15/02 204/263 |
| 2003/0031915 A1 | 2/2003 | Diez et al. | | |
| 2004/0159543 A1 * | 8/2004 | Boyer | ................. | H01M 8/0247 204/254 |
| 2008/0083614 A1 * | 4/2008 | Swalla | ....................... | C25B 9/20 204/242 |
| 2008/0280178 A1 | 11/2008 | Spink et al. | | |
| 2009/0255826 A1 * | 10/2009 | McWhinney | ............. | C25B 1/10 205/637 |
| 2011/0300467 A1 | 12/2011 | Spink et al. | | |
| 2011/0318665 A1 * | 12/2011 | Yamamoto | .......... | H01M 8/0273 429/469 |
| 2012/0214078 A1 | 8/2012 | Spink et al. | | |
| 2012/0258378 A1 | 10/2012 | Sugita et al. | | |
| 2016/0153099 A1 * | 6/2016 | McWhinney | ........... | C25B 13/02 204/295 |

* cited by examiner

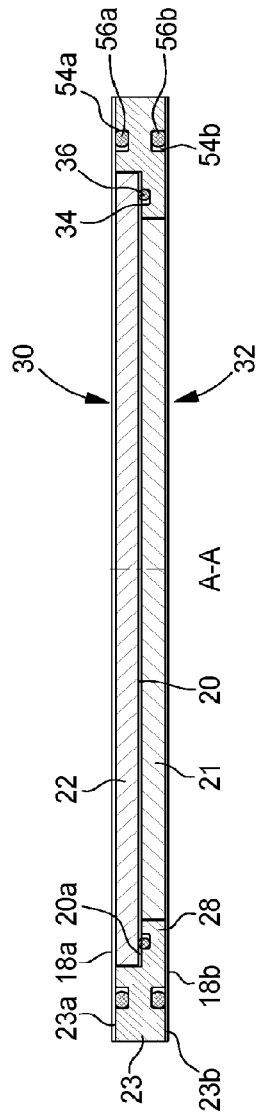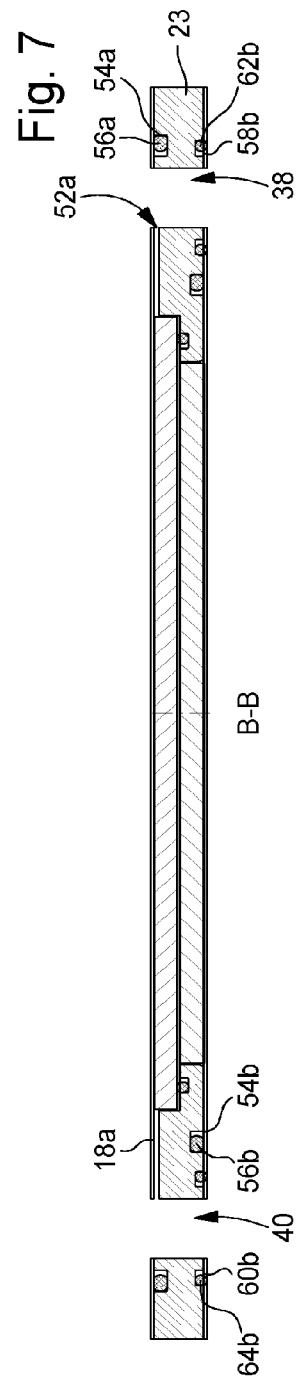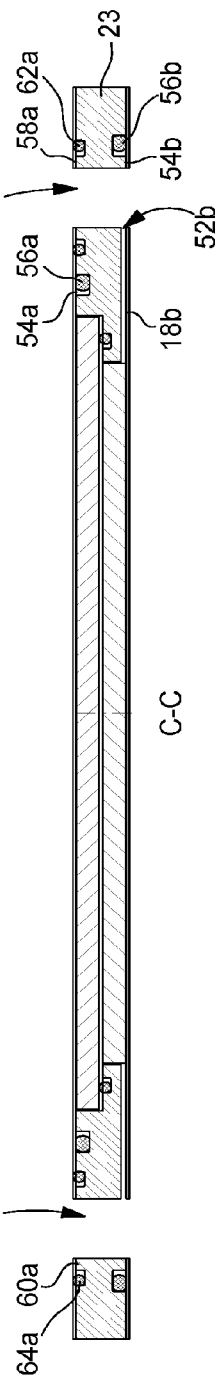

ELECTROCHEMICAL STACK DEVICE

This application claims priority from European Patent Application No. 14190301.3 filed on Oct. 24, 2014, the entire disclosure of which is hereby incorporated herein by reference.

FIELD OF THE INVENTION

The invention relates to an electrochemical device intended for the production of products through the electrochemical reaction of reactants, said electrochemical device comprising a stack of electrochemical cells, each cell comprising a structure, two bipolar plates shared with adjacent cells, a membrane/electrode assembly and two intermediate elements arranged to carry a current and the reactants/products to/from the membrane/electrode assembly.

BACKGROUND OF THE INVENTION

Such devices are known to those skilled in the art and are generally used as electrolyser to produce oxygen and hydrogen from water and electricity or as a fuel cell to produce water and electricity from oxygen and hydrogen. Among such devices, ion exchange membrane devices of the AEM (alkaline exchange membrane) and PEM (proton exchange membrane or polymer electrolyte membrane) type can be cited. These devices use a plurality of electrochemical cells in series, stacked between two end plates, along the longitudinal axis of the device, so as to form a stack. Such devices are described, for example, in Patent Publications WO 2011/114094 or US 2013/0122388. In these devices, the structure of an electrochemical cell comprises a frame formed of at least two parts, between which the membrane is held by the clamping of its peripheral area. A pressure is applied along the longitudinal axis of the device to ensure a good contact between the various elements of the cells. The axial pressure is generally applied by pressing, to a greater or lesser degree, the end plates which are connected by axial tie rods mounted around the cells. Consequently, high pressure is applied especially in the peripheral area of the membrane, which may cause it to weaken.

Further, the devices also comprise other support elements, notably supports for the electrodes as described in US 2013/0122388, so that known devices comprise a very large number of elements, which are difficult to manufacture and therefore expensive to produce. Further, the large number of elements makes it difficult to control the sealing between the various reactants and products, while it is evidently desired to avoid mixing hydrogen and oxygen. US 2013/0122388 describes, in particular, the use of a flat sealing gasket arranged at the periphery of the cell, between the frame and a bipolar plate, which makes it difficult to apply uniform pressure and achieve a regular distance between each cell.

SUMMARY OF THE INVENTION

It is an object of the invention to overcome the various drawbacks of these known techniques.

More precisely, it is an object of the invention to provide an electrochemical device making it possible to protect the membrane.

It is also an object of the invention to provide an electrochemical device allowing for repeatability of the pressure applied to the membrane and repeatability of the distance between each cell.

It is also an object of the invention to provide an electrochemical device that can ensure sealing, and to minimise the consequences in the event that sealing is not maintained.

It is also an object of the invention to provide a simple electrochemical device that is economical to manufacture, wherein elements can be mass produced and assembled in an at least semi-automatic manner.

To this effect, the present invention concerns an electrochemical device intended for the production of products through the electrochemical reaction of reactants, said electrochemical device comprising a stack of electrochemical cells, each cell comprising a structure, two bipolar plates shared with adjacent cells, a membrane/electrode assembly and two intermediate elements carrying current and reactants/products.

According to the invention, said structure of the cell comprises a single frame made in one piece, said frame having upper and lower faces respectively arranged to form a plane contact with the bipolar plates disposed on both sides of said frame, and a central opening arranged to receive the membrane/electrode assembly and the two intermediate elements, said frame comprising all the orifices necessary for feeding reactants and evacuating products, and housings arranged to receive sealing means or seals ensuring the sealing of each reactant and product.

Advantageously, the opening of the frame may comprise an inner peripheral shoulder on which rests a peripheral area of the membrane/electrode assembly, defining a first space which houses an intermediate element and a second space which houses the other intermediate element, said first and second spaces being respectively closed by one of the bipolar plates.

Preferably, said shoulder may comprise a first peripheral groove arranged to receive sealing means or seals.

Advantageously, the upper and lower faces of the frame may respectively comprise, around the opening, a second peripheral groove arranged to receive sealing means, and positioned so that the inlet and outlet ports pertaining to the reactants and products present on the same side of the membrane/electrode assembly are disposed inside the second peripheral groove and the orifices corresponding to the inlet and outlet ports pertaining to the reactants and products present on the other side of the membrane/electrode assembly are disposed outside said second peripheral groove, and third and fourth peripheral grooves arranged around orifices corresponding to the inlet and outlet ports pertaining to the reactants and products present on the other side of the membrane/electrode assembly, said third and fourth grooves being arranged to receive sealing means or seals.

Preferably, the upper and lower faces of the frame may respectively comprise a first hollow arranged to place the reactant inlet port in fluid communication with the associated intermediate element and a second hollow arranged to place said intermediate element in fluid communication with the product outlet port.

Advantageously, each bipolar plate may be a smooth metallic plate comprising reactant inlet ports and product outlet ports corresponding to those of the frame.

Thus, the electrochemical device of the invention comprises cells comprising few elements, these elements, notably the frame and the bipolar plates, being easy and economical to produce and to assemble, while protecting the sealing of the system in a simple manner.

BRIEF DESCRIPTION OF THE DRAWINGS

Other characteristics and advantages of the invention will appear more clearly upon reading the following description of a specific embodiment of the invention, given simply by way of illustrative and non-limiting example, and the annexed Figures, among which:

FIG. 5 is a top view of the lower face of the frame used in the electrochemical device of the invention.

FIG. 6 is a cross-sectional view along line A-A of FIG. 5.
FIG. 7 is a cross-sectional view along line B-B of FIG. 5.
FIG. 8 is a cross-sectional view along line C-C of FIG. 5.

DETAILED DESCRIPTION OF PREFERRED EMBODIMENTS

In the present description, the term "electrochemical device" includes, in particular, electrolysers and fuel cells, but also applies to devices for implementing other types of electrochemical methods, such as the "chloralkali" process. The present invention may be applied in a similar manner to these devices.

Such an electrochemical device is intended for the production of products through the electrochemical reaction of reactants, the reactants being hydrogen and oxygen and the products being water in the case of fuel cells, and the reactant being water and the products being hydrogen and oxygen in the case of electrolysers.

The following description is that of an electrolyser, but may be adapted by those skilled in the art to a fuel cell or to other devices implementing similar electrochemical processes.

Figure 1:
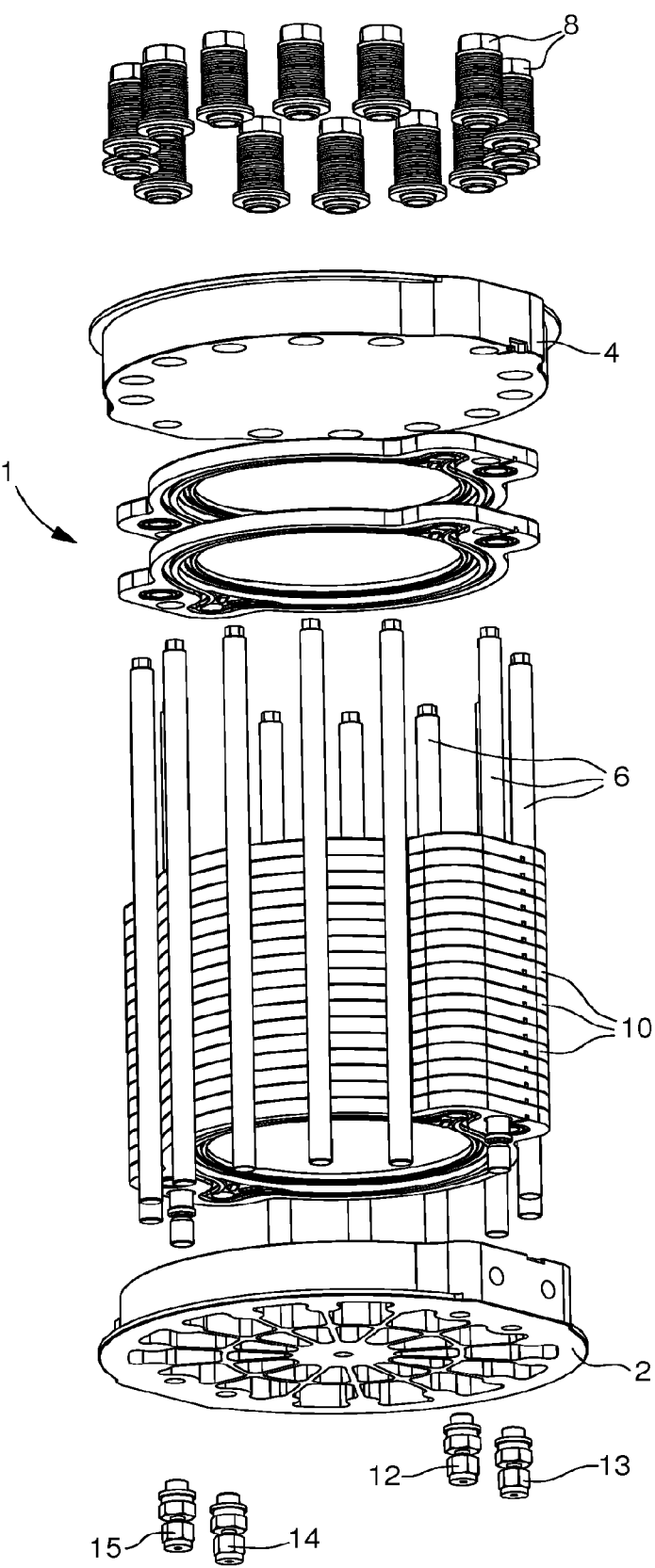
FIG. 1 is an exploded view of an electrochemical device according to the invention.

Referring to FIG. 1, electrochemical device 1 comprises, in a known manner, two end plates 2 and 4 connected by an assembly of axial tie rods 6 respectively provided with nuts associated with Belleville washer nuts 8 for example. Said axial tie rods and their nuts allow the necessary pressure to be applied to device 1. A plurality of electrochemical cells 10 is maintained between axial tie rods 6, said cells 10 being stacked on each other axially to form a stack. End plate 2 comprises pipe fittings or tubes 12, 13 for feeding the reactants and pipes fittings or tubes 14, 15 for evacuating the products.

Figure 2:
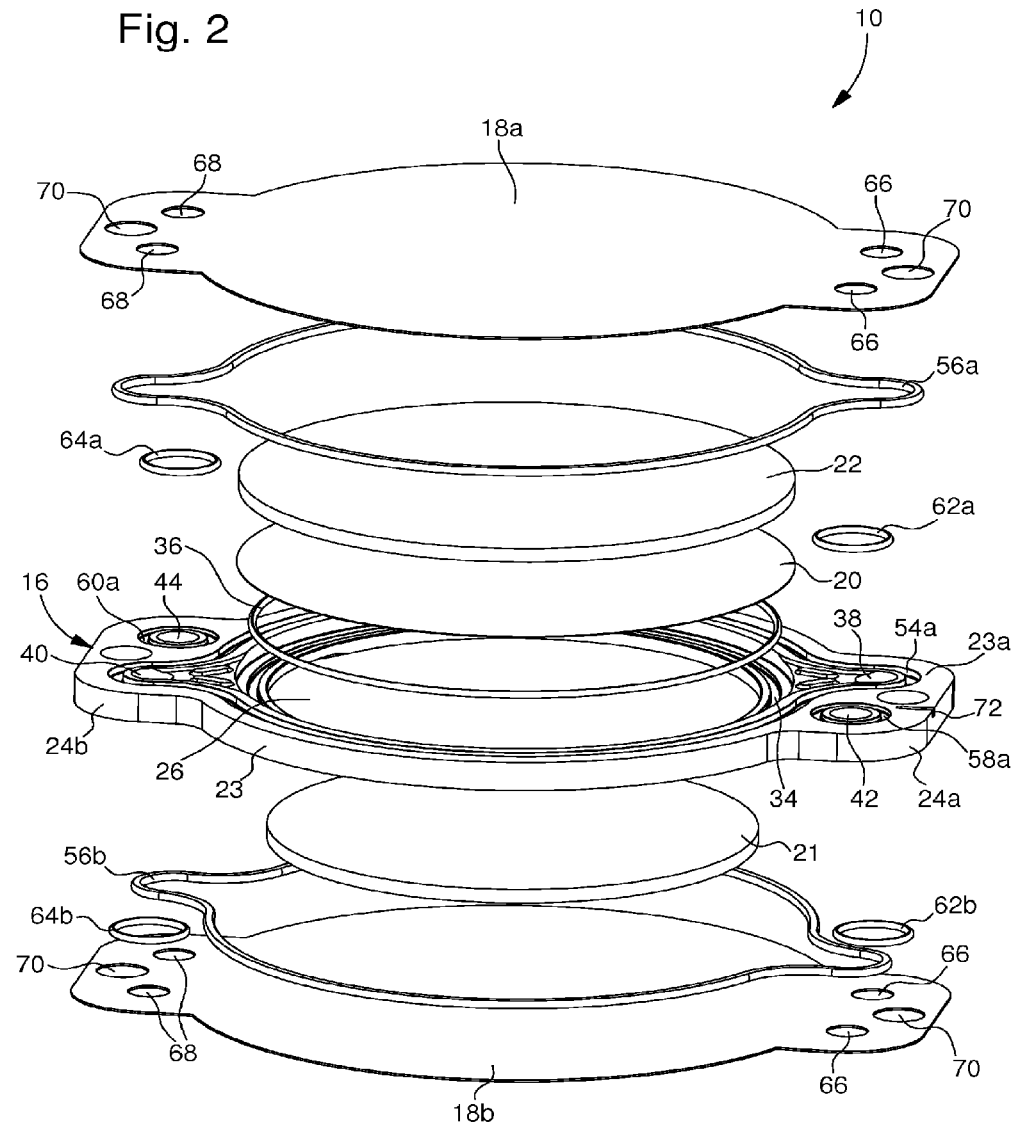
FIG. 2 is an exploded view of an electrochemical cell used in the electrochemical device of the invention.

Referring to FIG. 2, an electrochemical cell 10 comprises a structure 16, two bipolar plates 18a, 18b disposed on either side of structure 16, each bipolar plate 18a, 18b being common to the adjacent electrochemical cell. Cell 10 also comprises a membrane/electrode assembly 20 and two intermediate elements 21, 22 arranged, on the one hand, to carry a current and, on the other hand, to carry the reactants/products from/to the membrane/electrode assembly 20. The membrane/electrode assembly 20 comprising the ion exchange membrane and the two electrodes formed by thin layers of metallic paste bonded to the membrane, is known to those skilled in the art and does not require a detailed description here.

According to the invention, structure 16 of cell 10 is formed of a single frame 23, made in one piece. In the embodiment shown, frame 23 is preferably annular, but it is clear that any other appropriate shape is possible. Frame 23 is provided with two, diametrically opposite, outer rectangular lugs 24a, 24b, whose role will be explained hereafter. Frame 23 has an upper face 23a and a lower face 23b (the cell being seen in the axial direction) which are substantially plane, arranged respectively to form a plane contact with the associated bipolar plate 18a, 18b, disposed against the upper face 23a, respectively lower face 23b, of said frame 23.

Referring to FIGS. 3 to 8, frame 23 comprises a central opening 26 which houses the entire membrane/electrode assembly 20 in addition to intermediate elements 21 and 22. As more precisely shown in FIG. 6, opening 26 of frame 23 comprises a substantially plane, inner peripheral shoulder 28, on which rests an outer peripheral area 20a of membrane/electrode assembly 20, so as to define a first upper space 30 which houses one of the intermediate elements 22, and more precisely here the cathode intermediate element, and a second lower space 32 which houses the other intermediate element 21, and more precisely here the anode intermediate element. Intermediate element 22 occupying upper space 30 has larger dimensions (a diameter here) than those of intermediate element 21 occupying lower space 32. The outer peripheral area 20a of membrane/electrode assembly 20 resting on shoulder 28 is a non-active surface, producing no gas, which creates a free peripheral path enhancing the evacuation of the product formed on said intermediate element 22, which is hydrogen here.

Shoulder 28 comprises a first peripheral groove 34 arranged to receive sealing means 36, such as an O-ring joint, for ensuring sealing on both sides of the membrane/electrode assembly 20.

Said first and second spaces 30, 32 are respectively closed by one of bipolar plates 18a, 18b, the periphery thereof coming into contact with upper face 23a and lower face 23b respectively of frame 23 and the inner area thereof coming into contact with cathode intermediate element 22 and anode intermediate element 21 respectively.

In a particularly advantageous manner, intermediate elements 21 and 22 are made of a material that can ensure three functions: carrying current, carrying the reactants/products, from and to membrane/electrode assembly 20, and a function of pressing on membrane/electrode assembly 20. More specifically, one of the intermediate elements, here cathode intermediate element 22, presses membrane/electrode assembly 20 against O-ring joint 36, so as to maintain sealing on each side of membrane/electrode assembly 20. Thus, intermediate elements 21 and 22 are made of a conductive material, exhibiting suitable flexibility and porosity, to provide intermediate elements forming current collectors/distributors, flow plates and also pressure pads. In particular, it is possible to use grids made of titanium, steel or other metals which may or may not be coated with protective layers, whose structure forms guide channels for guiding the reactants or products to/from the membrane/electrode assembly. In particular, a trellis structure can be used.

The various elements are chosen such that the height of the membrane/electrode assembly and of intermediate elements 21 and 22 is slightly greater than the thickness of frame 23 prior to assembly, such that the membrane/electrode assembly and the intermediate elements can be properly compressed and entirely incorporated inside the cell frame when the electrochemical device is assembled.

Further, frame 23 comprises all the orifices required to feed the reactants and evacuate the products, in addition to housings arranged to receive sealing means or seals ensuring the sealing of each reactant and product. These sealing means or seals or gaskets are advantageously standard O-ring joints.

Figure 3:
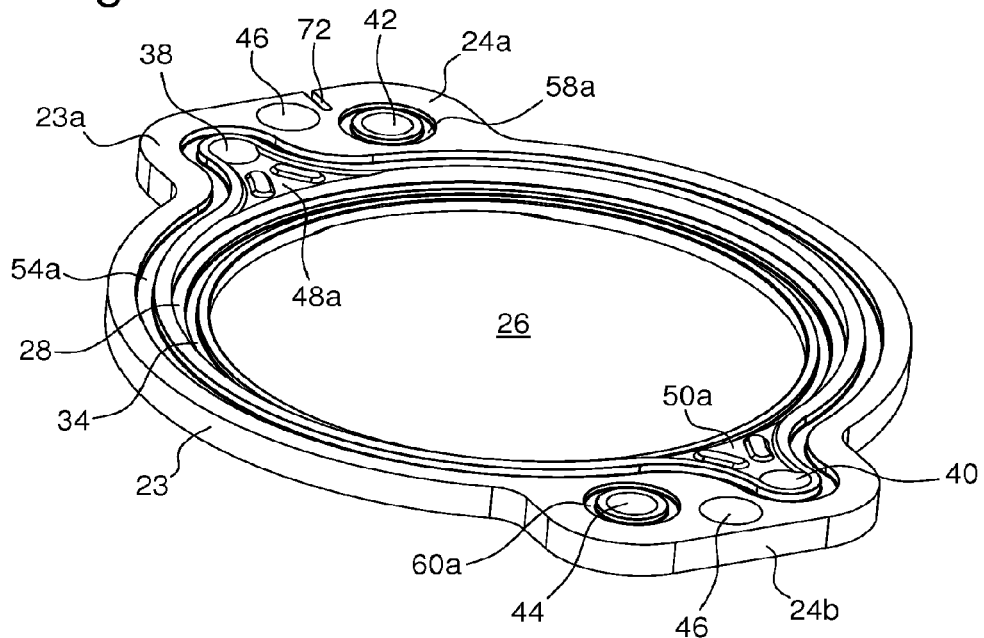
FIG. 3 is a perspective view of the upper face of the frame used in the electrochemical device of the invention.
Figure 4:
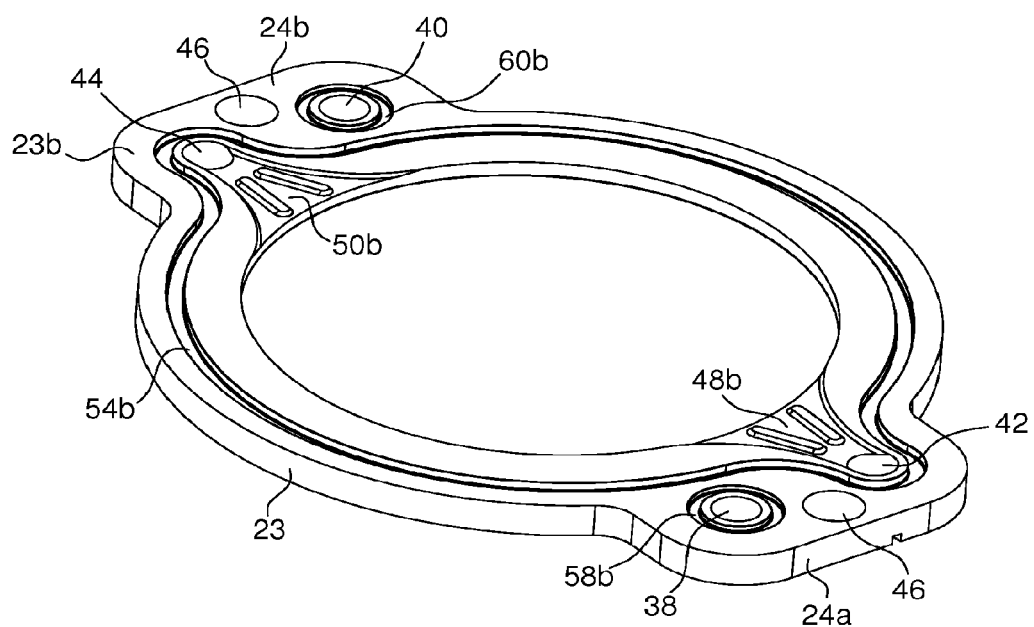
FIG. 4 is a perspective view of the lower face of the frame used in the electrochemical device of the invention.

More specifically with reference to FIGS. 3 and 4, frame 23 comprises (the cell being seen from the cathode side, namely the hydrogen production side in the "electrolyser" configuration), arranged on first lug 24a, a water inlet port 38 on the cathode side and arranged on second lug 24b, a hydrogen outlet port 40 on the cathode side, diametrically opposite water inlet port 38 on the cathode side. Frame 23 also comprises, arranged on first lug 24a, an orifice 42 corresponding to the water inlet port on the anode side and, arranged on second lug 24b, an orifice 44 corresponding to the oxygen outlet port on the anode side, diametrically opposite water inlet port 42 on the anode side. Advantageously, the through reactant inlet and product outlet ports 38, 40, 42 and 44 are disposed perpendicularly to the upper 23a and lower 23b faces of frame 23. Frame 23 also comprises, centred on each lug 24a, 24b, an orifice 46 for receiving an axial tie rod 6.

Referring to FIG. 3, upper face 23a of frame 23 comprises a first hollow 48a arranged to place reactant inlet port 38 (water here) in fluid communication with the cathode volume of the cell, and notably intermediate element 22, and a second hollow 50a arranged to place the cathode volume of the cell, and notably said intermediate element 22, in fluid communication with product outlet port 40 (hydrogen here). Likewise, referring to FIG. 4, lower face 23b of frame 23 comprises a first hollow 48b arranged to place reactant inlet port 42 (water here) in fluid communication with the anode volume of the cell, and notably intermediate element 21, and a second hollow 50b arranged to place the anode volume of the cell, and notably said intermediate element 21, in fluid communication with product outlet port 44 (oxygen here). As shown in FIGS. 7 and 8, the smaller thickness of frame 23 in the hollows makes it possible to form a passage 52a, 52b between frame 23 and bipolar plate 18a, 18b to allow feeding of the reactant or evacuation of the product to or from the intermediate element and the membrane/electrode assembly. Hollows 48 and 50 have a flared shape that narrows towards the associated inlet or outlet port, in order to improve orientation of the flow.

Referring to FIGS. 3 and 6 to 8, upper face 23a of frame 23 comprises, around central opening 26, a second peripheral groove 54a arranged to receive sealing means 56a, such as an O-ring joint. The second peripheral groove 54a is positioned such that reactant inlet port 38 (water here) on the side of cathode intermediate element 22 and product outlet port 40 (hydrogen here) on the side of said cathode intermediate element 22 are disposed inside the second peripheral groove 54a and such that the orifices 42 and 44 corresponding to the inlet and outlet ports pertaining to the reactant and product (oxygen here) on the side of anode intermediate element 21 present on the other side of membrane/electrode assembly 20 are disposed outside said second peripheral groove 54a. Upper face 23a of frame 23 also comprises a third peripheral groove 58a arranged around orifice 42 corresponding to the reactant inlet port on the side of anode intermediate element 21 and a fourth peripheral groove 60a arranged around orifice 44 corresponding to the product outlet port (oxygen here) on the side of said anode intermediate element 21. The third and fourth peripheral grooves 58a and 60a are arranged to receive sealing means 62a, 64a respectively, such as an O-ring joint.

Likewise, referring to FIGS. 4 and 6 to 8, lower face 23b of frame 23 comprises, around central opening 26, a second peripheral groove 54b arranged to receive sealing means 56b, such as an O-ring joint. The second peripheral groove 54b is positioned such that reactant inlet port 42 (water here) on the side of anode intermediate element 21 and product outlet port 44 (oxygen here) on the side of said anode intermediate element 21 are disposed inside the second peripheral groove 54b and such that the orifices 38 and 40 corresponding to the inlet and outlet ports pertaining to the reactant and product (hydrogen here) on the side of cathode intermediate element 22 present on the other side of membrane/electrode assembly 20 are disposed outside said second peripheral groove 54b. Lower face 23b of frame 23 also comprises a third peripheral groove 58b arranged around orifice 38 corresponding to the reactant inlet port on the side of cathode intermediate element 22 and a fourth peripheral groove 60b arranged around orifice 40 corresponding to the product outlet port (hydrogen here) on the side of said cathode intermediate element 22. The third and fourth peripheral grooves 58b and 60b are arranged to receive sealing means 62b, 64b respectively, such as an O-ring joint. Thus, sealing is thus ensured for each reactant and for each product, and a barrier is formed to prevent the products mixing. In the event of a leak, the products cannot mix with each other, but are discharged to the exterior.

Finally, frame 23 comprises on its upper face 23a, a notch 72 formed in the edge of lug 24a, said notch 72 being arranged to receive means for measuring the cell voltage, such as a plug. This plug is inserted into notch 72 of each cell 10 of the stack and is pressed against the adjacent bipolar plate. The plug has a spring effect to ensure a good electrical contact. Each cell 10 is therefore provided with a voltage tap, and the end anode plate 4. All the voltage measurements allow accurate monitoring of the performance of the stack, and detection of any problems or operating defects.

The frame may be made, for example, of plastic materials, such as polysulfone, PEEK etc., using simple manufacturing methods, such as injection moulding or any other moulding method allowing mass production.

Advantageously, each bipolar plate 18a, 18b is a smooth metallic plate and comprises orifices 66 for the passage of reactants, orifices 68 for the passage of products and orifices 70 for the passage of an axial tie rod 6, corresponding to those of frame 23. The dimensions (the diameter here) of bipolar plates 18a, 18b may correspond to those of frame 23 such that bipolar plates 18a, 18b are exactly superposed on frame 23, as in the variant shown here. In another embodiment, the bipolar plates may have dimensions (a diameter here) greater than those of the frame in order to leave the periphery of the bipolar plates free, forming an area enhancing the cooling of the device.

Electrochemical device 1 according to the invention is formed by stacking, between axial tie rods 6, a bipolar plate 18a, a frame 10 containing the anode and cathode intermediate elements 21 and 22 disposed on both sides of the membrane/electrode assembly 20, another bipolar plate 18b, another frame 10 containing anode and cathode intermediate elements 21 and 22 and the membrane/electrode assembly, etc. . . . , frames 10 always being positioned in the same orientation. The inlet ports 38, 42 pertaining to the same reactant and the outlet ports 40, 44 relating to the same product of different cells 10 are superposed to form inlet channels for the reactants and outlet channels for the products. These channels are connected to pipe fittings/tubes 12, 13 for feeding reactants and to pipe fittings/tubes 14, 15 for evacuating products. The assembly is then placed under stress by clamping end plates 2 and 4 by means of nuts screwed onto axial tie rods 6. The Belleville washers 8, pre-stressed by tightening the nuts, provide a "spring" function, which makes it possible to maintain an essentially constant stress on the stack, despite any changes in dimensions due to thermal expansion.

As a result of these different aspects of the invention, there is obtained an electrochemical device of simplified manufacturing. Indeed there is a reduced number of elements implemented and the various elements can be made simply, for mass production, and assembled in a semi-automatic or automatic manner. The O-ring joints are standard joints, available on the market. The bipolar plates are smooth plates, which do not require any guide channels to be formed. The use, for the intermediate elements, of a trellis frame allowing the passage of reactants and products in every direction removes the requirement to orient/machine the elements to form the guide channels. The assembly of the various elements is achieved simply by stacking, without adhesive bonding or any other complex assembly method, and without requiring high precision. In particular, the use of a membrane/electrode assembly incorporated in the frame, with relatively flexible intermediate elements, and O-ring joints positioned in the grooves provided on the frame makes it possible to absorb any variations in the dimensions of the parts. Further, the membrane, positioned entirely inside the central opening of the frame, is protected, since the pressure is essentially applied between the various frames and the bipolar plates and not on the membrane itself.

Further, the positioning of the membrane/electrode frame and the bipolar plates allows open paths to be provided, formed by the hollows for feeding reactants or evacuating products, whereas the prior art devices use hollow passages in the thickness of the structure.

The electrochemical device according to the invention also allows for repeatability of the distance between each cell. Since the contact between each frame and each bipolar plate is plane and implements hard surfaces, the O-ring joints are compressed in their respective groove, the distance between the cells is determined exclusively by the thickness of the frame provided with its bipolar plates.

The electrochemical device according to the invention can operate under balanced pressure on both sides of the membrane, i.e. for example to produce hydrogen and oxygen at a similar pressure. For example, the pressure may be comprised between 0 and 100 bars. It may also operate under non-balanced pressure.

Of course, the present invention is not limited to the illustrated example and is capable of various variants and modifications that will be evident to those skilled in the art.

What is claimed is:

1. An electrochemical device for production of products through electrochemical reaction of reactants,
    said electrochemical device comprising a stack of electrochemical cells, each cell comprising a structure, two bipolar plates shared with adjacent cells, a membrane/electrode assembly and two intermediate elements that carry current and reactants/products, wherein said structure of the cell comprises a single frame made in one-piece, said frame having upper and lower faces respectively arranged to form a plane contact with the bipolar plates disposed on either side of said frame, and a central opening arranged to receive the membrane/electrode assembly and the intermediate elements, said frame comprising orifices for feeding reactants and evacuating products, and housings arranged to receive O-ring joints ensuring the sealing of each reactant and product,
    wherein the opening of the frame comprises an inner peripheral shoulder on which rests a peripheral area of the membrane/electrode assembly, defining a first space which houses an intermediate element and a second space which houses the other intermediate element, said first and second spaces being respectively closed by one of the bipolar plates,
    wherein said shoulder comprises a first peripheral groove arranged to receive an O-ring joint, and
    wherein the upper and lower faces of the frame respectively comprise, around the opening, a second peripheral groove arranged to receive an O-ring joint, and positioned so that the inlet and outlet ports pertaining to the reactants and products present on the same side of the membrane/electrode assembly are disposed inside the second peripheral groove and the orifices corresponding to the inlet and outlet ports pertaining to the reactants and products present on the other side of the membrane/electrode assembly are disposed outside said second peripheral groove, and a third and a fourth peripheral grooves arranged around orifices corresponding to the inlet and outlet ports pertaining to the reactants and products present on the other side of the membrane/electrode assembly, said third and fourth grooves being arranged to receive O-ring joints.

2. The electrochemical device according to claim 1, wherein the height of the membrane/electrode assembly and of the intermediate elements is selected to be slightly greater than the thickness of the frame prior to assembly.

3. The electrochemical device according to claim 1, wherein the upper and lower faces of the frame respectively comprise a first hollow arranged to place the reactant feed orifice in fluid communication with the associated intermediate element, and a second hollow arranged to place said intermediate element in fluid communication with the product evacuation orifice.

4. The electrochemical device according to claim 1, wherein the orifices for feeding the reactants and evacuating the products are disposed perpendicularly to the upper face and lower face of the frame.

5. The electrochemical device according to claim 1, wherein each bipolar plate is a smooth metallic plate comprising reactant feed orifices and product evacuation orifices corresponding to those of the frame.

* * * * *